March 24, 1953     I. NESSON     2,632,195
ATTACHMENT FOR WINDSHIELD WIPER ARMS

Filed March 26, 1949     2 SHEETS—SHEET 1

Inventor:
Israel Nesson,
by Thomson & Thomson
Attorneys

March 24, 1953        I. NESSON        2,632,195
ATTACHMENT FOR WINDSHIELD WIPER ARMS
Filed March 26, 1949        2 SHEETS—SHEET 2

Inventor:
Israel Nesson,
by Thomson & Thomson
Attorneys

Patented Mar. 24, 1953

2,632,195

UNITED STATES PATENT OFFICE 2,632,195

ATTACHMENT FOR WINDSHIELD WIPER ARMS

Israel Nesson, Lynn, Mass., assignor to Max Zaiger, Swampscott, Mass.

Application March 26, 1949, Serial No. 83,720

2 Claims. (Cl. 15—250)

This invention relates to attachments for windshield wiper arms, and pertains more particularly to improvements in a hook-carrying attachment adapted to be removably applied to a wiper arm having a U-shaped end, for the purpose of converting the U-type arm end to a hook-type arm end.

As is well known, wiper arms are separably connected to windshield wiper blades through a clip or connector fixed to the blade, and the arm ends are of various types—including the so-called U-type and the hook-type—for attachment to clips or connectors of corresponding type. Frequently, a car owner desires to use a replacement wiper blade having a connector of one type when the wiper arm installed in his car is of a different type.

It is accordingly the principal purpose of this invention to provide a simple and economical form of attachment for easy application to a U-type arm end, so that a wiper blade equipped with a clip designed to fit a hook-type arm end may be efficiently connected to a U-type arm.

Recommended embodiments of the invention are shown in the accompanying drawings, but it will be understood that the structural details of the devices herein illustrated and described may be varied without departing from the essence of the invention as defined in the appended claims. In the drawings, Fig. 1 is a plan view of the U-shaped end of a wiper arm, with the improved hook-carrying attachment applied thereto;

Figure 4:
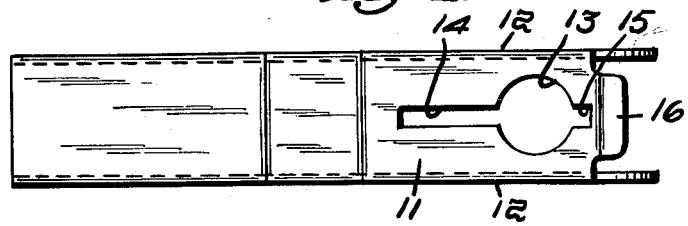
Fig. 4 is a plan or top view of a conventional form of a U-shaped arm end, with the attachment removed.
Figure 7:
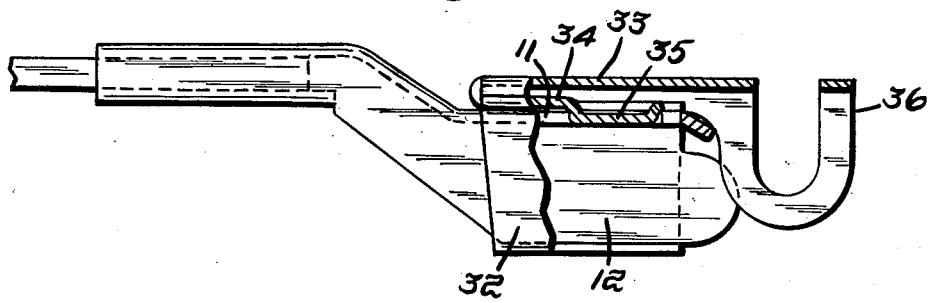
Fig. 7 is a side elevation of Fig. 5, partly broken away and in section.

The illustrated embodiments of the attachment are designed for application to a conventional type of U-shaped arm end, as best shown in Fig. 4, carried by a windshield wiper arm, as indicated in Fig. 7, and comprising a structure of inverted U form, having a top 11 and depending sides 12 which are adapted to straddle the sides of a wiper blade clip. The top 11 usually has a circular opening 13 communicating with longitudinal slots 14 and 15; and an inclined lip 16 at its free end.

Figure 1:
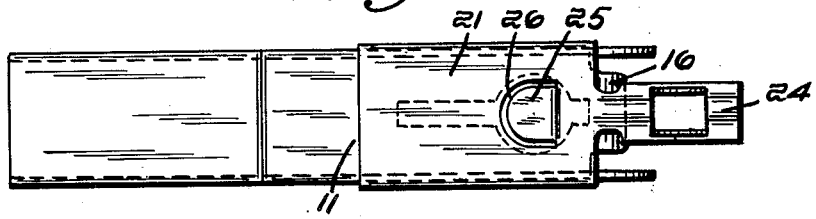
Figure 2:
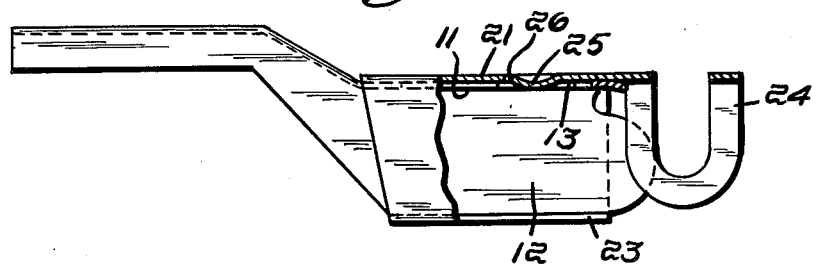
Fig. 2 is a side elevation of Fig. 1, partly broken away and in section.
Figure 3:
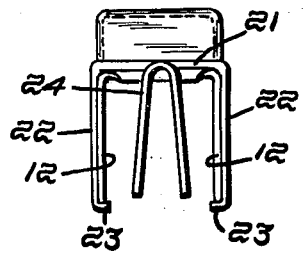
Fig. 3 is an end view looking to the left of Fig. 1.

In the particular embodiment of the present invention shown in Figs. 1 to 3, the improved attachment comprises a saddle member adapted slidably to embrace the U-shaped arm end of Fig. 4, and comprising a top 21, sides 22 formed with internal bottom flanges 23, and a bifurcated end-hook, showing generally at 24 and constituting a continuation of the top 11. The hook may be formed by cutting and bending an extension of the saddle top, but the precise manner in which the hook is formed is not essential to this invention.

The saddle attachment slips endwise over the U-shaped arm end with the bottom flanges 23 sliding under the edges of the sides 12 (Fig. 3). In order separably to hold the attachment in place, the saddle top 21 has a partially cut-out spring tongue 25 which is normally depressed or bowed downwardly and which releasably engages in the opening 13 of the top 11 of the arm end with a snap action, to serve as a latch normally preventing endwise movement of the saddle in a direction to the right of the figures. The latch-tongue is released by lifting its free end 26 with the finger nail or a suitable tool, to permit removal of the attachment.

Figure 5:
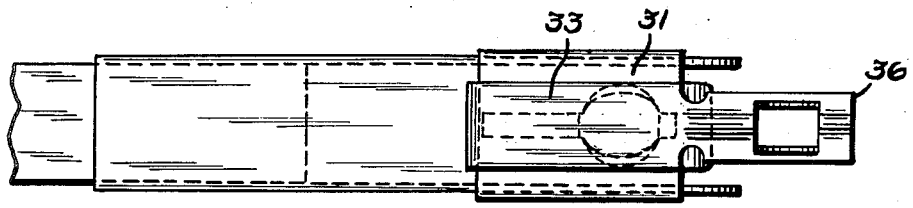
Fig. 5 is a view similar to Fig. 1, showing a modified form of attachment.
Figure 6:
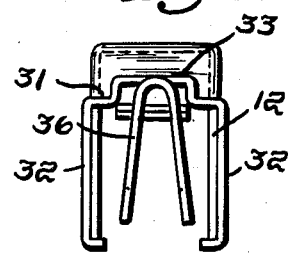
Fig. 6 is an end view looking to the left of Fig. 5.

In the modified form of attachment shown in Figs. 5 to 7, the sides 32 slidably embrace the arm end sides 12 as previously described, but the top 31 is formed with an elevated central ridge 33 provided with a rearward extension 34 which is bent forwardly under the ridge to overlie the top 11 of the arm end, and which is provided with a depressed, struck out tongue or latch element 35 releasably engageable in the opening 13 of said top 11. This latch functions in a manner similar to the latch 25 of Figs. 1 to 3, and may be released by pressure against its under side by a finger or suitable implement inserted upwardly into the U-shaped end.

The modified attachment has a bifurcated hook member 36 suitably formed as a continuation of the top 31.

In each of the forms herein illustrated, the saddle attachment is slidably connected to the arm end by the telescoping fit of the top, sides and bottom flanges of the saddle, and longitudinal or endwise movement of the saddle relative to the arm end is restrained by the releasable latch element.

I claim:

1. An attachment for a U-shaped wiper arm end having a top and sides and an opening in its top, comprising a saddle member having a top and sides adapted slidably to embrace said arm end, the saddle sides having bottom flanges extending substantially parallel to the saddle top along the length of said sides, said flanges slidably engaging under the sides of the arm end, and the saddle top having a partially cut-out resilient latching tongue releasably engageable in said top opening to restrain longitudinal movement of the saddle relative to the arm end, said tongue being struck out of the body of the saddle top and normally engaged in said opening.

2. An attachment for a U-shaped arm end having a top and sides and an opening in its top, comprising a saddle member having a top and sides adapted slidably to embrace said arm end, the saddle sides having bottom flanges engaging under the sides of the arm end, said saddle top having an elevated longitudinal ridge provided with a longitudinal extension reversely bent to underlie said ridge and overlie the top of the arm end, and said extension having a latching element releasably engageable in said top opening to restrain longitudinal movement of the saddle relative to the arm end.

ISRAEL NESSON.

REFERENCES CITED

The following references are of record in the file of this patent:

UNITED STATES PATENTS

| Number | Name | Date |
| --- | --- | --- |
| 2,172,928 | Anderson | Sept. 12, 1939 |
| 2,426,418 | Seaver | Aug. 26, 1947 |